(12) United States Patent
Tsai et al.

(10) Patent No.: US 9,934,122 B2
(45) Date of Patent: Apr. 3, 2018

(54) EXTRACTING RICH PERFORMANCE ANALYSIS FROM SIMPLE TIME MEASUREMENTS

(71) Applicant: Microsoft Corporation, Redmond, WA (US)

(72) Inventors: Adrian Tsai, Kirkland, WA (US); Thomas Davidson, Lynnwood, WA (US); James Bartlett, Woodinville, WA (US); Shawn Hargreaves, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/327,523

(22) Filed: Jul. 9, 2014

(65) Prior Publication Data

US 2016/0011955 A1     Jan. 14, 2016

(51) Int. Cl.
*G06F 9/44*      (2006.01)
*G06F 11/34*     (2006.01)

(52) U.S. Cl.
CPC ...... *G06F 11/3466* (2013.01); *G06F 11/3419* (2013.01); *G06F 2201/865* (2013.01); *G06F 2201/88* (2013.01)

(58) Field of Classification Search
CPC .......................................................... G06F 9/44
USPC .................. 717/124, 125, 127, 130, 131
See application file for complete search history.

(56) References Cited

U.S. PATENT DOCUMENTS

| | | | |
|---|---|---|---|
| 5,903,278 A * | 5/1999 | Mitchell | G06T 15/00 345/418 |
| 6,314,470 B1 | 11/2001 | Ward et al. | |
| 6,792,460 B2 * | 9/2004 | Oulu et al. | 709/224 |
| 8,006,232 B1 * | 8/2011 | Rideout | G06F 11/3664 709/217 |
| 8,032,867 B2 * | 10/2011 | Bansal | G06F 11/3419 717/127 |
| 8,527,624 B2 | 9/2013 | Chen et al. | |
| 8,572,581 B2 * | 10/2013 | Shafi et al. | 717/131 |
| 8,587,593 B2 * | 11/2013 | Elmieh et al. | 345/502 |
| 8,819,643 B1 * | 8/2014 | Ellis et al. | 717/131 |
| 2003/0014562 A1 * | 1/2003 | Noyle | G06T 15/00 719/328 |
| 2009/0037774 A1 * | 2/2009 | Rideout | G06F 11/362 714/38.1 |
| 2009/0125891 A1 * | 5/2009 | Garimella et al. | 717/131 |
| 2010/0153925 A1 * | 6/2010 | Klein | 717/127 |
| 2011/0113405 A1 | 5/2011 | Guerrera et al. | |
| 2012/0081376 A1 * | 4/2012 | Sowerby | G06T 1/20 345/522 |
| 2013/0263096 A1 * | 10/2013 | Hulick | 717/130 |

* cited by examiner

*Primary Examiner* — Jae Jeon
(74) *Attorney, Agent, or Firm* — Fogarty LLP

(57) ABSTRACT

Embodiments of the invention rely on simple time measurements to extract rich performance analysis from a graphics program. The invention times the program as it repeatedly executes on a selected platform, while a series of variations are applied to the program with each execution. As a result, without requiring any specific profiling tools for the platform, a developer can analyze and understand the performance characteristics of the program based upon these elapsed time measurements. The program can then be optimized to incorporate variations that improve execution time.

20 Claims, 4 Drawing Sheets

EXTRACTING RICH PERFORMANCE ANALYSIS FROM SIMPLE TIME MEASUREMENTS

BACKGROUND

Graphics platforms can help developers understand and optimize the performance characteristics of a program by exposing hardware performance counters. This gives a deeper visibility into what the hardware is doing so that the developer can identify bottlenecks and other problems. However, this solution is not universally supported on all hardware and graphics driver combinations.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The present invention provides graphics application performance analysis using repeated replay of an application programming interface (API) capture stream with minor variations on each replay. Using this process, rich performance data may be programmatically extracted from hardware or a driver that only supports simple time measurements.

Offline graphics frame analysis is used to analyze and optimize the rendering performance of applications. The frame analysis uses the same information that is captured in a graphics log file for diagnostic purposes, but this information is used instead to summarize rendering performance. The performance information is not recorded to the log during capture, but is generated later by timing events and collecting statistics during frame analysis as the frame is played back. This approach provides several advantages over simply recording performance information during capture.

Embodiments of the invention rely on simple time measurements to extract rich performance analysis from a graphics program. The invention times the program as it repeatedly executes on a selected platform, while a series of variations are applied to the program with each execution. As a result, without requiring any specific profiling tools for the platform, a developer can analyze and understand the performance characteristics of the program based upon these elapsed time measurements. The program can then be optimized to incorporate variations that improve execution time.

DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1:
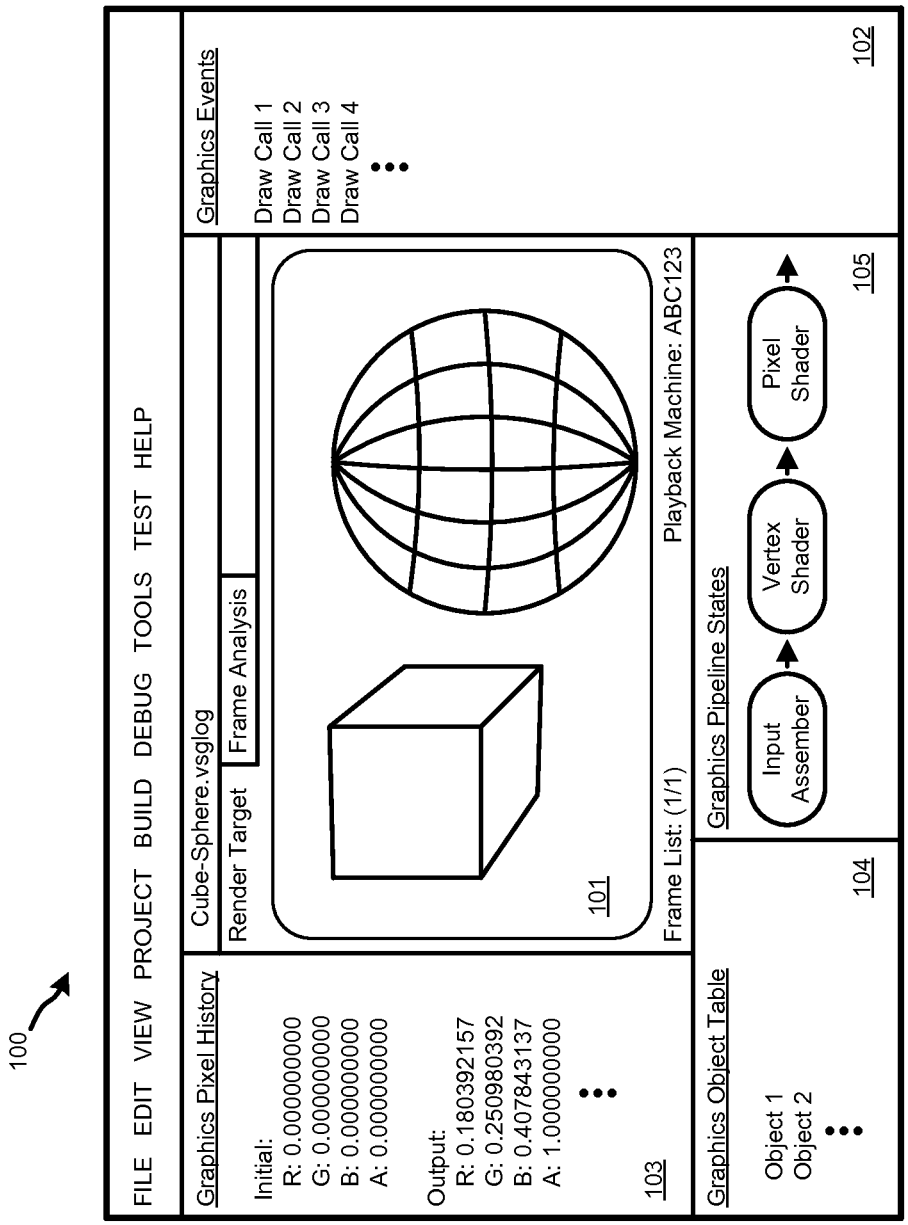
FIG. 1 is a block diagram illustrating an Integrated Development Environment that consolidates development tasks into one tool that can be used by developers to build and optimize applications.

FIG. 1 is a block diagram illustrating an Integrated Development Environment (IDE) 100 that consolidates development tasks into one tool that can be used by developers to build and optimize applications. A frame form a graphics project is displayed in area 101. A list of draw calls associated with drawing the frame is shown in area 102. In the illustrated example, a simple cube and globe are shown; however, it will be understood that the present invention can be used with rendering involving any level of complexity. IDE 100 may provide additional information about a graphics project, such as pixel history 103, object table 104, pipeline states 105, and/or other relevant data.

IDE 100 may be used, for example, by a developer to analyze and debug rendering in an application. Typically, a developer will debug the rendering using capture/reply diagnostics, wherein all low-level graphics API calls and parameters for a frame are captured and saved or logged to a file as an API call trace or graphics diagnostic trace. The trace can then be replayed using the IDE, which allows the developer to inspect API state, view pixel history, pipeline objects, render target content, etc., and to debug rendering errors. The IDE will replay the logged API calls exactly as made by the application to reconstruct the frame call-by-call.

Timing queries can be inserted between each draw call or between groups of draw calls in the logged API trace. This allows the IDE to determine how long it took each draw call to execute. This allows the developer to determine how much graphic processing unit (GPU) time was required for each draw call. Embodiments of the invention allow the developer to do additional in-depth offline graphics frame analysis using the logged API calls. The IDE 100 replays the logged trace back multiple times and changes different aspects of the rendering on each replay. For example, over several replays a different rendering variant is performed, such as turning on 4× MSAA in a first replay, enabling 16× AF in a second replay, halving texture sizes in a third replay, etc.

A graphics frame analysis function in the IDE first measures performance information per draw call for an unmodified replay of the trace. This establishes a baseline time for each draw call. Then, for each subsequent reply a change is made in the rendering, the graphics frame analysis again measures the performance information per draw call to determine the impact of each change. The IDE then builds a table that illustrates how long each draw call took for each variation. This draw call information can be used by the developer to evaluate the impact of each variation and to infer what the GPU is doing during each draw call. The developer can then use this information to optimize the rendering in the application by incorporating variations that improve or decrease the graphics timing and avoiding variations that degrade or increase the timing.

Figure 2:
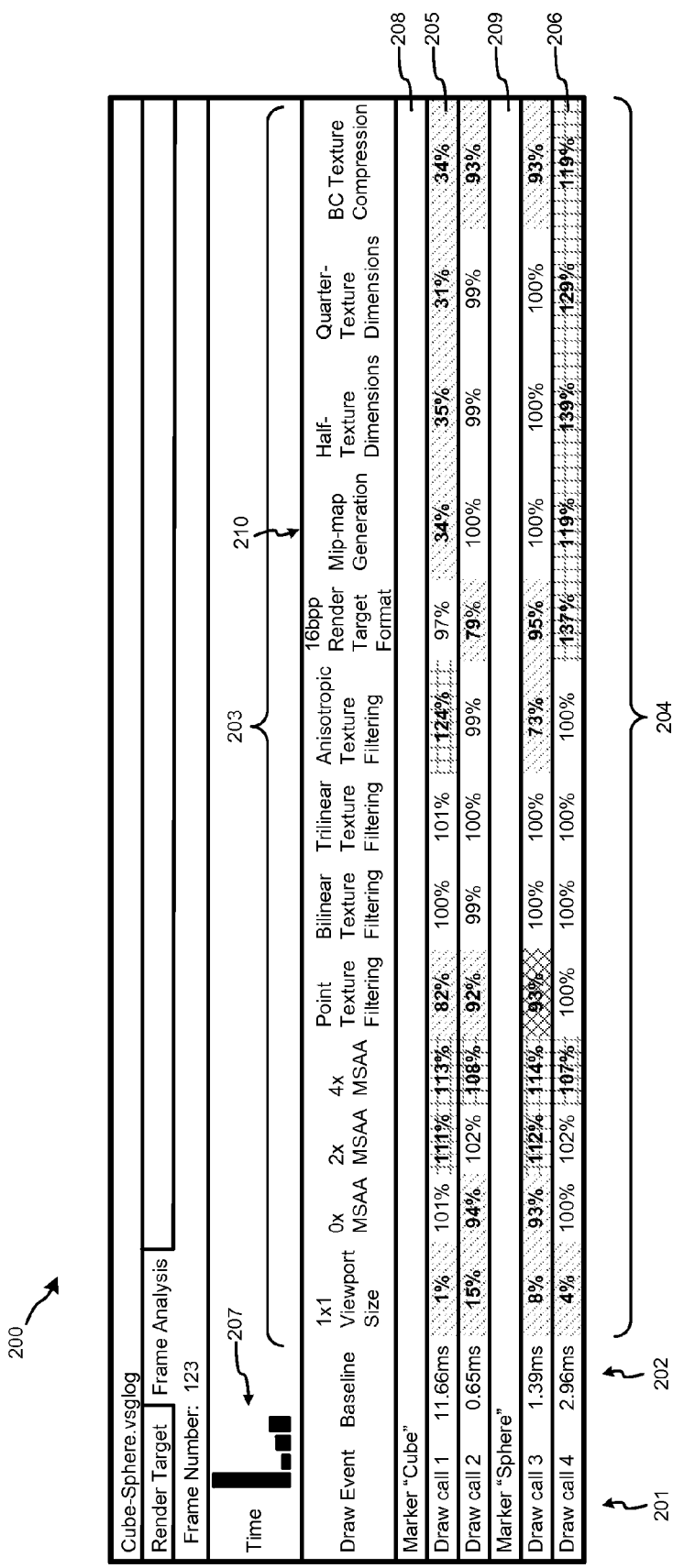
FIG. 2 illustrates a frame analysis report according to one embodiment.

FIG. 2 illustrates a frame analysis report 200 according to one embodiment. For each of the draw calls 201 associated with a selected frame, the report provides a baseline rendering time 202. A series of additional renderings are replayed with a different variation on each run. The variations for each replay are shown in heading 203, which represent a series of experiments applied to the application. For each of these variations or experiments, the report provides an indication of the rendering time 204 for each draw call 201.

In report 200, the rendering times 204 are displayed as a percent difference relative to the baseline. A value of 100% indicates that there was no change relative to the baseline measurement when the trace was replayed with the variant. A value less than 100% indicates that the variant caused the replay to be faster than the baseline, and a value greater than 100% indicates that the variant caused the replay to be slower than the baseline. For example, a rendering time that takes twice as long compared to the baseline for a particular variation would be shown as 200%, while a rendering time that was half the baseline time would be shown as 50%.

It will be understood that the timing for each variation may be displayed in any other format. For example, actual times in milliseconds or microseconds may be shown for each variation instead of the baseline-percentage values. Alternatively, both an actual time and a percentage of the baseline may be displayed.

Additionally, the rendering times for each variation may be highlighted to indicate their relative value compared to its respective baseline time for that draw call. The highlighting may be applied as changes to text color, font, background, etc. For example, in report 200, render time variations that are less than the baseline time are highlighted with a first background cross-hatch pattern 205, and render time variations that are more than the baseline time are highlighted with a second background cross-hatch pattern 206. Different highlighting may be used to further indicate a degree of variation from the baseline value. For example, different shades of red may be used to highlight times that are slower than the baseline, with brighter shades indicating a larger difference from the baseline. To bring attention to rendering variations that have the highest relevance, the highlighting may be used to indicate changes only when they are different from the baseline by more than a threshold value or a statistically significant amount. For example, in FIG. 2, the cross-hatch highlighting is applied only to values that vary from the baseline by more than 5%. Results that are not statistically significant are displayed in normal typeface and left uncolored.

In another embodiment, to bring attention to draw calls that consume a greater proportion of overall rendering time or that might be unusually slow, the row in the report table containing these "hot" draw calls may be shaded red when the baseline timing is more than one standard deviation longer than the mean baseline timing of all draw calls in the frame.

Report 200 also displays a bar chart 207 wherein each bar represents the time for one of the draw calls. Taller bars indicate longer draw calls. The height of the bars may represent an absolute time for each draw call or a relative time with respect to an overall rendering time. This allows the developer to quickly identify which draw calls took the longest. Each bar corresponds to a draw call, and the tallest bar represents the "most expensive" draw call in terms of rendering time by the GPU. The bars in chart 207 may correspond to the baseline times 202, or the bars may correspond to one of the variations 203 selected by the developer.

The bar chart 207 timeline provides a visual overview of draw call timings relative to each other. Larger bars correspond to longer draw times. This makes the bar chart timeline useful for quickly locating the most expensive draw calls in the frame. When the captured frame contains a very large number of draw calls, multiple draw calls may be combined into a single bar whose length is the sum of those draw calls. In other embodiments, the user may select or "hover" a pointing device over the bars to see the corresponding draw call event in the report table. Choosing a bar causes the report event list to synchronize to the selected event.

The application code may be annotated with user-defined event markers and event groups (e.g., D3DPERF marker events). Different draw calls that correspond to different elements of the frame may be grouped into one area or one line of the report table. The event markers can be used to mark out sections of the rendering to assist the developer in determining which draw calls correspond to which elements. For example, marker 208 identifies draw calls associated with the cube element, and marker 209 identifies draw calls associated with the sphere element.

The baseline values 202 are the timing values for each draw call without any changes applied. These values are obtained by measuring the GPU time taken to execute each draw call from the diagnostic trace. The variation values 204 are obtained by remeasuring the GPU time for each draw call as the experiments 203 are applied—i.e., when some aspect 204 of the playback has been changed and the trace is replayed.

Each experiment or variant run by the frame analysis process changes the way a frame is rendered during playback. The set of variants that the frame analysis operation examines corresponds to common changes that the developer might make to improve rendering performance or visual quality of an application, such as reducing the size of textures, using texture compression, or enabling different kinds of anti-aliasing. These variants override the usual rendering context and parameters of the application. The paragraphs summarize typical variants that might be used for offline frame analysis; however, it will be understood that any other variants might also be applied in an experiment.

1×1 Viewport Size—reduces the viewport dimensions on all render targets to 1×1 pixels. A smaller viewport reduces the number of pixels that must be shaded, but does not reduce the number of vertices that must be processed. Setting the viewport dimensions to 1×1 pixels effectively eliminates pixel-shading from the application. When this variant indicates a large performance gain, the application may be consuming too much fillrate. This may indicate that the selected resolution is too high for the target platform or that the application spends significant time shading pixels that are later overwritten (i.e., overdraw). This result suggests that decreasing the size of the frame buffer or reducing the amount of overdraw will improve the application's performance.

0×/2×/4× MSAA—disables multi-sample anti-aliasing (MSAA) or enables 2×/4× MSAA on all render targets. This overrides MSAA settings on all render targets and swap chains. Multi-sample anti-aliasing increases visual quality by taking samples at multiple locations in each pixel; greater levels of MSAA take more samples, and without MSAA, only one sample is taken from the pixel's center. Enabling MSAA in the application usually has a modest but noticeable cost in rendering performance, but under certain workloads or on certain GPUs, it can be had with almost no impact. If the application already has MSAA enabled, then the lesser MSAA variants indicate a relative performance cost that the existing, higher-level MSAA incurs. In particular, the 0× MSAA variant indicates the relative performance of the application without MSAA. If the application does not already have MSAA enabled, then the 2× MSAA and 4× MSAA variants indicate the relative performance cost of enabling them in the application. When the cost is acceptably low, consider enabling MSAA to enhance the image quality of the application. If the selected platform does not fully support MSAA for all formats, then the column in the performance summary table for unsupported formats may be blank and/or an error message may be produced.

Point/Bilinear/Trilinear/Anisotropic Texture Filtering—sets the filtering mode to point, bilinear, trilinear, or 16× anisotropic texture filtering for all appropriate texture samples. This variant overrides the filtering mode on appropriate texture samplers. Different methods of texture sampling have different performance costs and image quality. In order of increasing cost—and increasing visual quality—the filter modes are:

1. Point filtering (least expensive, worst visual quality),
2. Bilinear filtering,
3. Trilinear filtering, and
4. Anisotropic filtering (most expensive, best visual quality).

If the performance cost of each variant is significant or increases with more-intensive filtering modes, the developer may weigh its cost against its increased image quality. Based on that assessment, the developer might accept additional performance costs to increase visual quality, or might accept decreased visual quality to achieve a higher frame-rate or to reclaim performance that can be used in other ways. If the performance cost is negligible or steady regardless of the filtering mode—for example, when the targeted GPU has an abundance of shader throughput and memory bandwidth—the developer may consider using anisotropic filtering to achieve the best image quality in the application.

16 bpp Render Target Format—sets the pixel format to 16 bits per pixel (bpp), B5G6R5 format for all render targets and back buffers. A render target or back buffer typically uses a 32 bpp format, such as a 32 bpp B8G8R8A8 format, which may consume a lot of memory bandwidth. Because the 16 bpp B5G6R5 format is half the size of the 32 bpp formats, using this format may relieve pressure on memory bandwidth, but at the cost of reduced color fidelity. If this variant shows a large performance gain, it likely indicates that the application consumes too much memory bandwidth. Performance gains may be pronounced when the profiled frame includes a significant amount of overdraw or contains a lot of alpha-blending.

If the scenes that are rendered by the application do not require high-fidelity color reproduction, do not require the render target to have an alpha channel, and do not often contain smooth gradients, which are susceptible to banding artifacts under reduced color fidelity, then the developer may consider using a 16 bpp render target format to reduce memory bandwidth usage. If the scenes that are rendered in the application require high-fidelity color reproduction or an alpha channel, or smooth gradients are common, the developer may consider other strategies to reduce memory bandwidth usage. For example, the developer may reduce the amount of overdraw or alpha-blending, reduce the dimensions of the frame buffer, or modify texture resources to consume less memory bandwidth by enabling compression or reducing their dimensions. As with any modification, the developer will have to consider the image quality trade-offs that come with any of these optimizations. GPU architectures that use tiled rendering techniques may see significant performance benefits by using a 16 bpp frame buffer format because a larger portion of the frame buffer can fit in each tile's local frame buffer cache.

Mip-map Generation—enables mip-maps on all textures that are not render targets. Mip-maps are primarily used to eliminate aliasing artifacts in textures under minification by pre-calculating smaller versions of the texture. Although these additional textures consume GPU memory (e.g., about 33 percent more than the original texture), they are also more efficient because more of their surface area fits in the GPU texture cache and its contents achieve higher utilization. For 3-D scenes, mip-maps are recommended when memory is available to store the additional textures because they increase both rendering performance and image quality. If this variant shows a significant performance gain, it indicates that the application is using textures without enabling mip-maps and, therefore, not getting the most from the texture cache.

Half/Quarter Texture Dimensions—reduces the texture dimensions on all textures that are not render targets to a half or a quarter of their original size in each dimension. For example, a 256×128 texture is reduced to 128×64 texels (one-half) or 64×32 texels (one-quarter) in size. Smaller textures occupy less memory and, therefore, consume less memory bandwidth and reduce pressure on the GPU's texture cache. However, lesser detail may result in reduced image quality, especially when the textures are viewed closely in a 3-D scene or under magnification. If this variant shows a large performance gain, it may indicate that the application consumes too much memory bandwidth and/or uses the texture cache inefficiently. It may also indicate that the textures occupy more GPU memory than is available, which causes textures to be paged to system memory. If the application consumes too much memory bandwidth or uses the texture cache inefficiently, the developer may consider reducing the size of the textures, but should first consider enabling mip-maps for appropriate textures. Mip-mapped textures consume less memory bandwidth—at the expense of more GPU memory—and increase cache utilization without reducing texture detail. If the textures occupy more GPU memory than is available, the developer may consider reducing the size of the textures, but should first consider compressing appropriate textures. Compressed textures occupy less memory and reduce the need to page to system memory, but their color fidelity is reduced.

BC Texture Compression—enables block compression on all textures that have a B8G8R8X8, B8G8R8A8, or R8G8B8A8 pixel format variant. B8G8R8X8 format variants are compressed using BC1, B8G8R8A8 and R8G8B8A8 format variants are compressed using BC3. Block-based compression formats like BC1, BC2, and BC3 occupy significantly less memory than uncompressed image formats and, therefore, consume significantly less memory bandwidth. Compared to an uncompressed format that uses 32 bbp, BC1 (formerly known as DXT1) achieves 8:1 compression and BC3 (formerly known as DXT5) achieves 4:1 compression. The difference between BC1 and BC3 is that BC1 doesn't support an alpha channel, while BC3 supports a block-compressed alpha channel. Despite the high compression ratios, there is only a minor reduction in image quality for typical textures. However, block compression of certain kinds of textures, such as those that have significant color variation in a small area, can have unacceptable results. If the textures are suitable for block-based compression and do not need perfect color fidelity, the developer may consider using a block-compressed format to reduce memory usage and consume less bandwidth.

The experiment results in table 200 can also be used by the developer to determine whether a variant is turned on in the baseline application. For example, if mip-map generation was turned on in the application, then experiment 210 would have no effect. However, since the mip-map generation experiment 210 indicates a significant performance change for draw call 1, the developer knows not only that mip-maps would affect the application, but that it was not already turned on for this draw call.

After making changes to the application based upon the offline frame analysis report, the developer can rerun the frame analysis and further refine the application.

Figure 3:
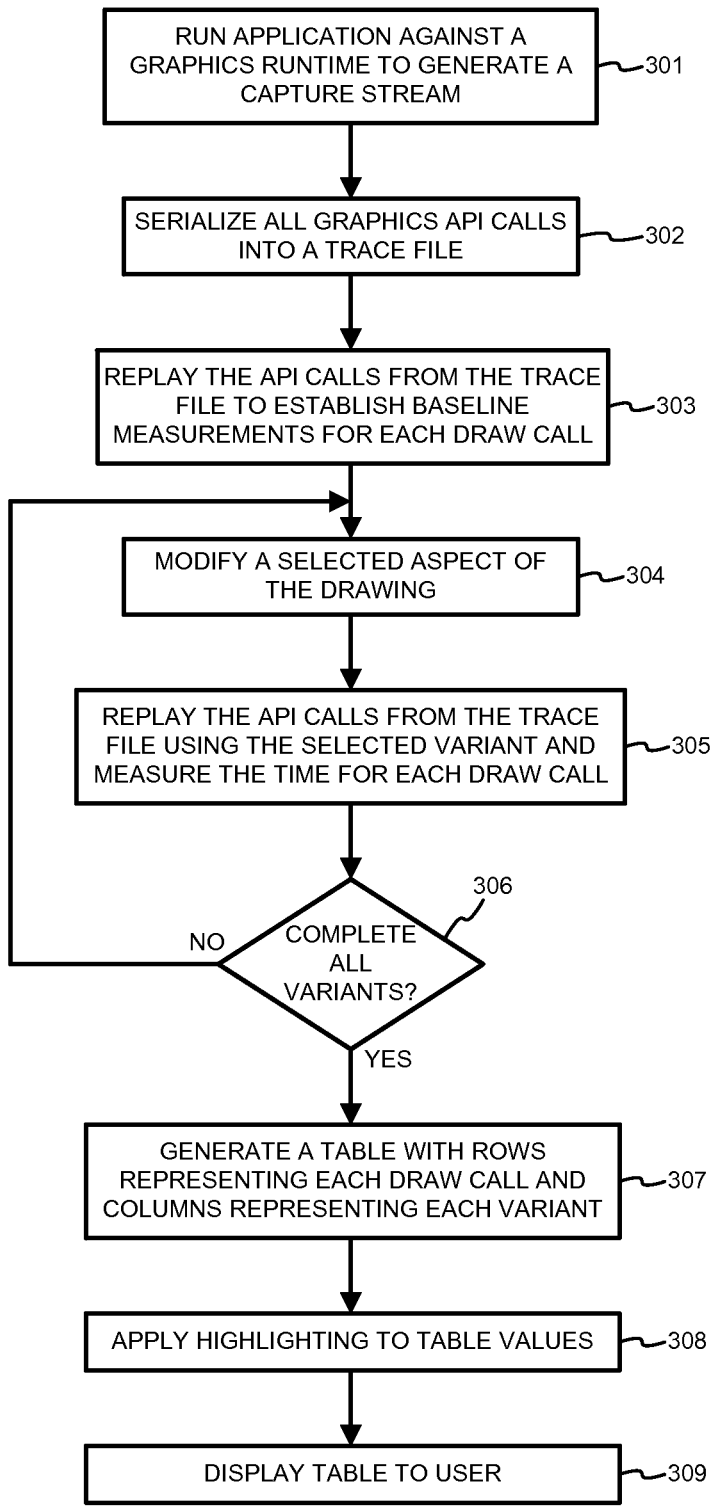
FIG. 3 is a flowchart illustrating a process for analyzing a graphics application according to one embodiment.

FIG. 3 is a flowchart illustrating a process for analyzing a graphics application according to one embodiment. In step 301, a capture stream is generated by running a graphics application against a special instrumented graphics runtime. In step 302, all graphics API calls are serialized into a trace file on a storage mechanism.

In step 303, the command stream of API calls in the trace file is replayed to establish baseline timing measurements for each draw call. In the first replay, the API calls are run exactly as issued by the application, but with the addition of time measurements around each draw call. This allows us to determine exactly how long each draw takes to process on the selected graphics hardware.

In steps 304 and 305, the command stream of API calls is fed through a series of experiments. In step 304, a selected aspect of the drawing is modified. For example, the size or format of textures, size or format of output render target, or graphics states, such as mip-mapping and texture filtering mode, may be selected for modification. In step 305, the command stream of API calls in the trace file is replayed with the selected variant in place and the time for each draw call is measured again.

In 306, the process evaluates whether all of the variants have been applied. If additional modifications need to be tested, then the process returns to step 304 and another selected modification is applied to the drawing. If the application has been relayed using all variants and measurements have been taken for all modifications, then the process moves to step 307. The analysis engine replays the stream of API commands multiple times. Each replay repeats the rendering originally performed by the application, but one or more commands are varied from one replay to another.

In step 307, a table of the draw call timing measurements is generated. The rows of the table represent the timing of GPU execution of each draw call and the columns represent the variants that were applied in each reply. In step 308, highlighting may be applied to the table, such as designating variant measurements that were higher or lower than the baseline measurement. A default highlighting scheme may be applied, or the user may configure a desired highlighting scheme or no scheme. In step 309, the table is displayed to the user.

By comparing the times measured for the variants of the rendering work against the original, non-modified version, the developer may draw sophisticated performance conclusions about the application. Some experiments will make the application run faster, while others may slow it down or produce no timing change. By examining the full set of results, it is possible for a developer to understand exactly what hardware bottlenecks are occurring for each draw call and thereby identify how the application can be optimized.

The frame analysis may average results from multiple playbacks of the same frame to ensure that the performance summary is statistically sound and to reduce measurement error. For example, multiple replays of the frame may be run using the same variant for each replay. The results from the replays associated with a particular variant are then averaged and displayed to the user in the report table. In one embodiment, the displayed timing values for both the baseline absolute timing and the relative timing of the rendering variants are the mean average of multiple runs (e.g., 5 replays for the baseline and each variant). This averaging helps to ensure that timing data is reliable and consistent. In other embodiments, the developer may hover over each cell in the table for the rendering variants and baseline timing to see the timing values that were observed (e.g., all values, plus minimum, maximum, mean, and median values) when generating results for that draw call.

The frame analysis may generate performance information for hardware configurations and devices other than the one where the information was captured. For example, the replays may be run against a different hardware configuration than the hardware used to capture the API trace.

The frame analysis may also be used to generate new performance summaries from previously-captured information. For example, as a GPU's driver is optimized, the stored API trace may be replayed using the new driver. Alternatively, the stored API trace may be replayed using additional debugging features.

Figure 4:
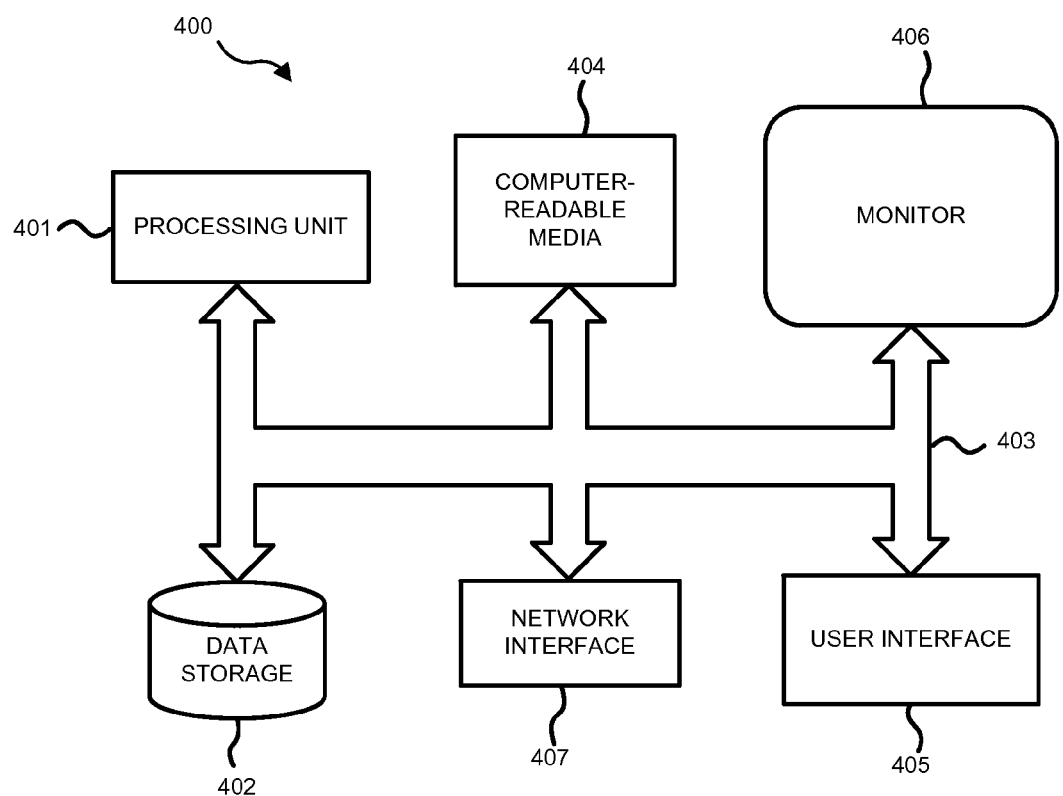
FIG. 4 illustrates an example of a computing and networking environment, such as a developer machine and/or remote cloud-based servers or virtual machines that supports debugger clients and/or remote processes being debugged.

FIG. 4 illustrates an example of a computing and networking environment 400, such as a developer machine and/or remote cloud-based servers or VMs, that supports a debugger client and/or IDE along with applications being debugged as well as facilitates analyzing graphics applications as described herein. The computing system environment 400 is only one example of a suitable computing environment and is not intended to suggest any limitation as to the scope of use or functionality of the invention. The invention is operational with numerous other general purpose or special purpose computing system environments or configurations. Examples of well-known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The debug client, controller, connector, agent, monitor and software instances being debugged may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 4, an exemplary system for implementing various aspects of the invention may include a general purpose computing device in the form of a computer 400. Components may include, but are not limited to, various hardware components, such as processing unit 401, data storage 402, such as a system memory, and system bus 403 that couples various system components including the data storage 402 to the processing unit 401. The system bus 403 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 400 typically includes a variety of computer-readable media 404. Computer-readable media 404 may be any available media that can be accessed by the computer 401 and includes both volatile and nonvolatile media, and removable and non-removable media, but excludes propagated signals. By way of example, and not limitation, computer-readable media 404 may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 400. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media. Computer-readable media may be embodied as a computer program product, such as software stored on computer storage media.

The data storage or system memory 402 includes computer storage media in the form of volatile and/or nonvolatile memory such as read only memory (ROM) and random access memory (RAM). A basic input/output system (BIOS), containing the basic routines that help to transfer information between elements within computer 400, such as during start-up, is typically stored in ROM. RAM typically contains data and/or program modules that are immediately accessible to and/or presently being operated on by processing unit 401. By way of example, and not limitation, data storage 402 holds an operating system, application programs, and other program modules and program data.

Data storage 402 may also include other removable/non-removable, volatile/nonvolatile computer storage media. By way of example only, data storage 402 may be a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The drives and their associated computer storage media, described above and illustrated in FIG. 4, provide storage of computer-readable instructions, data structures, program modules and other data for the computer 400.

A user may enter commands and information through a user interface 405 or other input devices such as a tablet, electronic digitizer, a microphone, keyboard, and/or pointing device, commonly referred to as mouse, trackball or touch pad. Other input devices may include a joystick, game pad, satellite dish, scanner, or the like. Additionally, voice inputs, gesture inputs using hands or fingers, or other natural user interface (NUI) may also be used with the appropriate input devices, such as a microphone, camera, tablet, touch pad, glove, or other sensor. These and other input devices are often connected to the processing unit 401 through a user input interface 405 that is coupled to the system bus 403, but may be connected by other interface and bus structures, such as a parallel port, game port or a universal serial bus (USB). A monitor 406 or other type of display device is also connected to the system bus 403 via an interface, such as a video interface. The monitor 406 may also be integrated with a touch-screen panel or the like. Note that the monitor and/or touch screen panel can be physically coupled to a housing in which the computing device 400 is incorporated, such as in a tablet-type personal computer. In addition, computers such as the computing device 400 may also include other peripheral output devices such as speakers and printer, which may be connected through an output peripheral interface or the like.

The computer 400 may operate in a networked or cloud-computing environment using logical connections 407 to one or more remote devices, such as a remote computer. The remote computer may be a personal computer, a server, a router, a network PC, a peer device or other common network node, and typically includes many or all of the elements described above relative to the computer 400. The logical connections depicted in FIG. 4 include one or more local area networks (LAN) and one or more wide area networks (WAN), but may also include other networks. Such networking environments are commonplace in offices, enterprise-wide computer networks, intranets and the Internet.

When used in a networked or cloud-computing environment, the computer 400 may be connected to a public or private network through a network interface or adapter 407. In some embodiments, a modem or other means for establishing communications over the network. The modem, which may be internal or external, may be connected to the system bus 403 via the network interface 407 or other appropriate mechanism. A wireless networking component such as comprising an interface and antenna may be coupled through a suitable device such as an access point or peer computer to a network. In a networked environment, program modules depicted relative to the computer 400, or portions thereof, may be stored in the remote memory storage device. It may be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, comprising:
    capturing all graphics application programming interface (API) calls generated by an application for a selected interval, wherein an event marker identifies one or more graphics API calls that correspond to a specific element of a frame to be rendered by the graphics application;
    executing a first replay of the graphics API calls without modification to an application drawing;
    measuring a baseline execution time for each graphics API call during the first replay for a first hardware configuration;
    modifying the first hardware configuration during each additional reply;
    automatically executing additional replays of the graphics API calls against different hardware configurations than the first hardware configuration;
    measuring an additional execution time for each graphics API call during each of the additional replays; and
    generating a report table including the event marker associated with each measured graphics API call and further including the identification of a rendered element associated with each measured graphics API call.

2. The method of claim 1, wherein the report table further includes the baseline execution times for the first replay and the additional execution times for at least one additional replay.

3. The method of claim 2, wherein the baseline execution times for the first replay are displayed in the report table as elapsed time values, and the additional execution times are displayed in the report table as a percentage of a corresponding baseline execution time.

4. The method of claim 2, further comprising:
    for each graphics API call, comparing each additional execution time to a corresponding baseline execution time; and
    selecting a highlight characteristic for each additional execution time based upon its value relative to the baseline execution time.

5. The method of claim 4, wherein the highlight characteristic indicates whether the additional execution time is faster or slower than the corresponding baseline execution time.

6. The method of claim 4, wherein the highlight characteristic is applied to an additional execution time only when the value relative to the baseline execution time exceeds a predetermined threshold.

7. The method of claim 1, further comprising:
    storing the captured API calls from the application to a trace file, and retrieving the captured API calls from the trace file for each replay.

8. The method of claim 2, wherein automatically executing additional replays of the graphics API calls further comprises:
    selecting an aspect of the application drawing to be modified during additional replays; and
    executing the plurality of additional replays of the graphics API calls using the same selected modification.

9. The method of claim 8, wherein the baseline execution times and the additional execution times in the report table comprise an average of a plurality of replays using the same modification to the selected aspect.

10. The method of claim 1, wherein the selected interval is a frame of rendering or a period of time.

11. A system, comprising:
    a processor executing a debugging application; and
    a storage device storing code for a graphics application;
    wherein the debugging application causes the graphics application to run the graphics application, captures all graphics application programming interface (API) calls generated by the graphics application for a selected interval, wherein an event marker identifies one or more graphics API calls that correspond to a specific element of a frame to be rendered by the graphics application; and
    wherein the debugging application further causes a first replay of the graphics API calls to execute without a rendering modification, measures a baseline execution time for each graphics API call during the first replay for a first hardware configuration, causes the first hardware configuration to be modified during each additional reply and additional replays of the graphics API calls to automatically execute against different hardware configurations than the first hardware configuration, measures an additional execution time for each graphics API call during each of the additional replays, and generates a report table including the event marker associated with each measured graphics API call and further including the identification of a rendered element associated with each measured graphics API call.

12. The system of claim 11, wherein the report table further includes the baseline execution times for the first replay and the additional execution times for at least one additional replay.

13. The system of claim 12, wherein the baseline execution times for the first replay are displayed in the report table as elapsed time values, and the additional execution times are displayed in the report table as a percentage of a corresponding baseline execution time.

14. The system of claim 12, wherein the debugging application is further configured to compare each additional execution time to a corresponding baseline execution time for each graphics API call, and select a highlight characteristic for each additional execution time based upon its value relative to the baseline execution time.

15. The system of claim 14, wherein the highlight characteristic indicates whether the additional execution time is faster or slower than the corresponding baseline execution time.

16. The system of claim 14, wherein the highlight characteristic is applied to an additional execution time only when the value relative to the baseline execution time exceeds a predetermined threshold.

17. The system of claim 11, wherein the debugging application is further configured to retrieve the API calls from a trace file on the storage device for each replay.

18. The system of claim 12, wherein the debugging application is further configured to select an aspect of the application drawing to be modified during additional replays, and executes the plurality of additional replays of the graphics API calls using the same selected modification.

19. The system of claim 18, wherein the baseline execution times and the additional execution times in the report table comprise an average of a plurality of replays using the same modification to the selected aspect.

20. The system of claim 11, wherein the selected interval is a frame of rendering or a period of time.

* * * * *